United States Patent

Sablan, Sr.

[11] Patent Number: 5,911,435
[45] Date of Patent: Jun. 15, 1999

[54] AIR BAG RESTRICTOR

[76] Inventor: Daniel M. Sablan, Sr., 74 Mosswood Dr., Suisun City, Calif. 94585

[21] Appl. No.: 09/026,421

[22] Filed: Feb. 19, 1998

[51] Int. Cl.$^6$ ............................. B60R 21/16; B60R 21/05
[52] U.S. Cl. .......................... 280/731; 280/731; 280/750; 24/3.13
[58] Field of Search ..................................... 280/731, 750; 70/209, 226, 211, 212; 24/13, 3.13, 356, 458, 629, 664

[56] References Cited

U.S. PATENT DOCUMENTS

| | | | |
|---|---|---|---|
| 5,115,652 | 5/1992 | Starmer | 70/209 |
| 5,197,308 | 3/1993 | Pazik | 70/209 |
| 5,277,440 | 1/1994 | Jackson, Jr. | 280/731 |
| 5,363,679 | 11/1994 | Prasad | 70/209 |
| 5,419,584 | 5/1995 | Halford | 280/728.2 |
| 5,445,406 | 8/1995 | Jones | 280/731 |
| 5,784,760 | 7/1998 | Leitzke et al. | 24/3.13 |

*Primary Examiner*—Robert J. Oberleitner
*Assistant Examiner*—L. Jasmin

[57] ABSTRACT

A new air bag restrictor for restricting the inflation of a driver's side air bag that has not inflated after a crash to permit safe extraction of an injured person within the vehicle. The inventive device includes an elongate bar having a longitudinal axis, a first end portion, a central portion, and a second end portion. The central portion is designed for positioning over the central hub of a steering wheel housing an air bag device. The second end portion is designed for abutting against the backside of a portion of the peripheral rim of a steering wheel. The first end portion forms a hook having an arcuate region and an arm region. The arm region of the hook is spaced apart from the central region to define a hooking space for receiving another portion of the perimeter rim of a steering wheel therein. The arm region also has a first bore extending therethrough while the central portion has a second bore extending therethrough coaxial with the first bore. One end of a securing pin is insertable through the first and second bores to secure a portion of the peripheral rim of a steering wheel within the hook space.

6 Claims, 2 Drawing Sheets

AIR BAG RESTRICTOR

BACKGROUND OF THE INVENTION

1. Field of the Invention

The present invention relates to devices for restricting the inflation of a driver's side air bag and more particularly pertains to a new air bag restrictor for restricting the inflation of a driver's side air bag that has not inflated after a crash to permit safe extraction of an injured person within the vehicle.

2. Description of the Prior Art

The use of devices for restricting the inflation of a driver's side air bag is known in the prior art. More specifically, devices for restricting the inflation of a driver's side air bag heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for restricting the inflation of a driver's side air bag include U.S. Pat. No. 5,115,652; U.S. Pat. No. 5,197,308; U.S. Pat. No. 5,363,679; U.S. Pat. No. 5,445,406; U.S. Pat. No. 5,419,584; and U.S. Pat. No. Des. 354,668.

Air bags have been known to inflate long after initial impact, which can injure the drive or rescuer. While these devices fulfill their respective, particular objectives and requirements, the aforementioned patents do not disclose a new air bag restrictor. Particularly, these devices are neither easily positionable on nor easily securable to a steering wheel of a crashed motor vehicle by a rescuer typically positioned outside of the vehicle because an injured person is sitting in the driver's position (i.e. —the driver's seat) of the vehicle. The inventive device includes an elongate bar having a longitudinal axis, a first end portion, a central portion, and a second end portion. The central portion is designed for positioning over the central hub of a steering wheel housing an air bag device. The second end portion is designed for abutting against the backside of a portion of the peripheral rim of a steering wheel. The first end portion forms a hook having an arcuate region and an arm region. The arm region of the hook is spaced apart from the central region to define a hooking space for receiving another portion of the perimeter rim of a steering wheel therein. The arm region also has a first bore extending therethrough while the central portion has a second bore extending therethrough coaxial with the first bore. One end of a securing pin is insertable through the first and second bores to secure a portion of the peripheral rim of a steering wheel within the hook space.

In these respects, the air bag restrictor according to the present invention substantially departs from the conventional concepts and designs of the prior art, and in so doing provides an apparatus primarily developed for the purpose of restricting the inflation of a driver's side air bag that has not inflated after a crash to permit safe extraction of an injured person within the vehicle.

SUMMARY OF THE INVENTION

In view of the foregoing disadvantages inherent in the known types of devices for restricting the inflation of a driver's side air bag now present in the prior art, the present invention provides a new air bag restrictor construction wherein the same can be utilized for restricting the inflation of a driver's side air bag that has not inflated after a crash to permit safe extraction of an injured person within the vehicle.

The general purpose of the present invention, which will be described subsequently in greater detail, is to provide a new air bag restrictor apparatus and method which has many of the advantages of the devices for restricting the inflation of a driver's side air bag mentioned heretofore and many novel features that result in a new air bag restrictor which is not anticipated, rendered obvious, suggested, or even implied by any of the prior art devices for restricting the inflation of a driver's side air bag, either alone or in any combination thereof.

To attain this, the present invention generally comprises an elongate bar having a longitudinal axis, a first end portion, a central portion, and a second end portion. The central portion is designed for positioning over the central hub of a steering wheel housing an air bag device. The second end portion is designed for abutting against the backside of a portion of the peripheral rim of a steering wheel. The first end portion forms a hook having an arcuate region and an arm region. The arm region of the hook is spaced apart from the central region to define a hooking space for receiving another portion of the perimeter rim of a steering wheel therein. The arm region also has a first bore extending therethrough while the central portion has a second bore extending therethrough coaxial with the first bore. One end of a securing pin is insertable through the first and second bores to secure a portion of the peripheral rim of a steering wheel within the hook space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air bag restrictor apparatus and method which has many of the advantages of the devices for restricting the inflation of a driver's side air bag mentioned heretofore and many novel features that result in a new air bag restrictor which is not anticipated, rendered obvious, suggested, or even implied by any of the prior art devices for restricting the inflation of a driver's side air bag, either alone or in any combination thereof.

It is another object of the present invention to provide a new air bag restrictor which may be easily and efficiently manufactured and marketed.

It is a further object of the present invention to provide a new air bag restrictor which is of a durable and reliable construction.

An even further object of the present invention is to provide a new air bag restrictor which is susceptible of a low cost of manufacture with regard to both materials and labor, and which accordingly is then susceptible of low prices of sale to the consuming public, thereby making such air bag restrictor economically available to the buying public.

Still yet another object of the present invention is to provide a new air bag restrictor which provides in the apparatuses and methods of the prior art some of the advantages thereof, while simultaneously overcoming some of the disadvantages normally associated therewith.

Still another object of the present invention is to provide a new air bag restrictor for restricting the inflation of a driver's side air bag that has not inflated after a crash to permit safe extraction of an injured person within the vehicle without the risk of injury from a late deploying air bag.

Yet another object of the present invention is to provide a new air bag restrictor which includes an elongate bar having a longitudinal axis, a first end portion, a central portion, and a second end portion. The central portion is designed for positioning over the central hub of a steering wheel housing an air bag device. The second end portion is designed for abutting against the backside of a portion of the peripheral rim of a steering wheel. The first end portion forms a hook having an arcuate region and an arm region. The arm region of the hook is spaced apart from the central region to define a hooking space for receiving another portion of the perimeter rim of a steering wheel therein. The arm region also has a first bore extending therethrough while the central portion has a second bore extending therethrough coaxial with the first bore. One end of a securing pin is insertable through the first and second bores to secure a portion of the peripheral rim of a steering wheel within the hook space.

Still yet another object of the present invention is to provide a new air bag restrictor that is easily positionable on and easily securable to a steering wheel of a crashed motor vehicle by a rescuer typically positioned outside of the vehicle because an injured person is sitting in the driver's position to permit safe extraction of an injured person in the front seat of the crashed vehicle.

Even still another object of the present invention is to provide a new air bag restrictor that is able to be used quickly and efficiently to restrict the deployment of a driver's side air bag.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
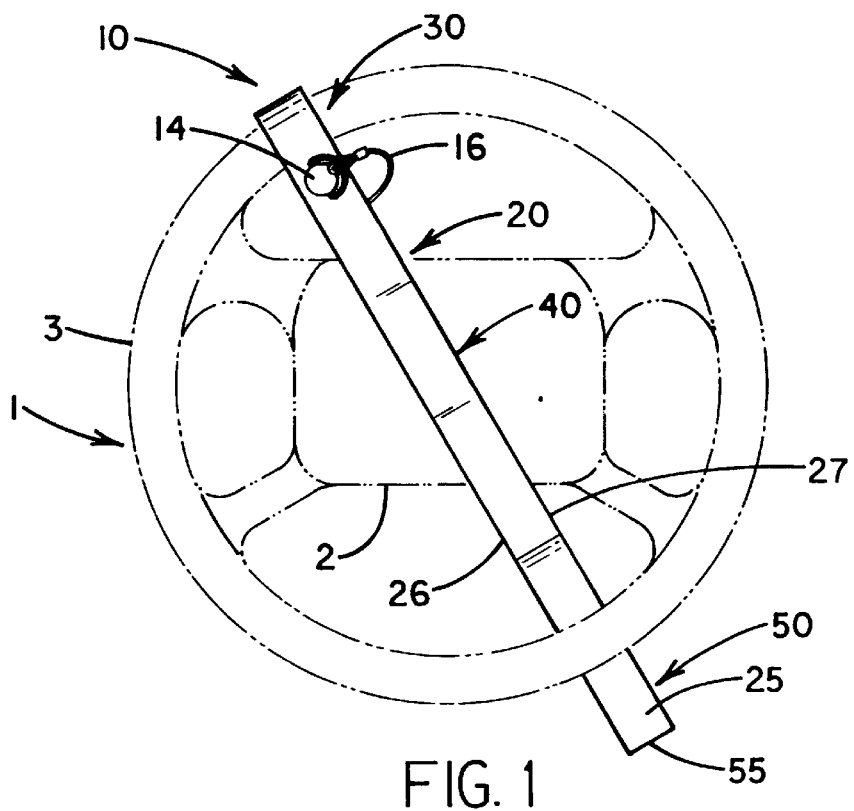
FIG. 1 is a schematic top side view of a new air bag restrictor mounted to a steering wheel having an air bag housed within its central hub according to the present invention.
Figure 2:
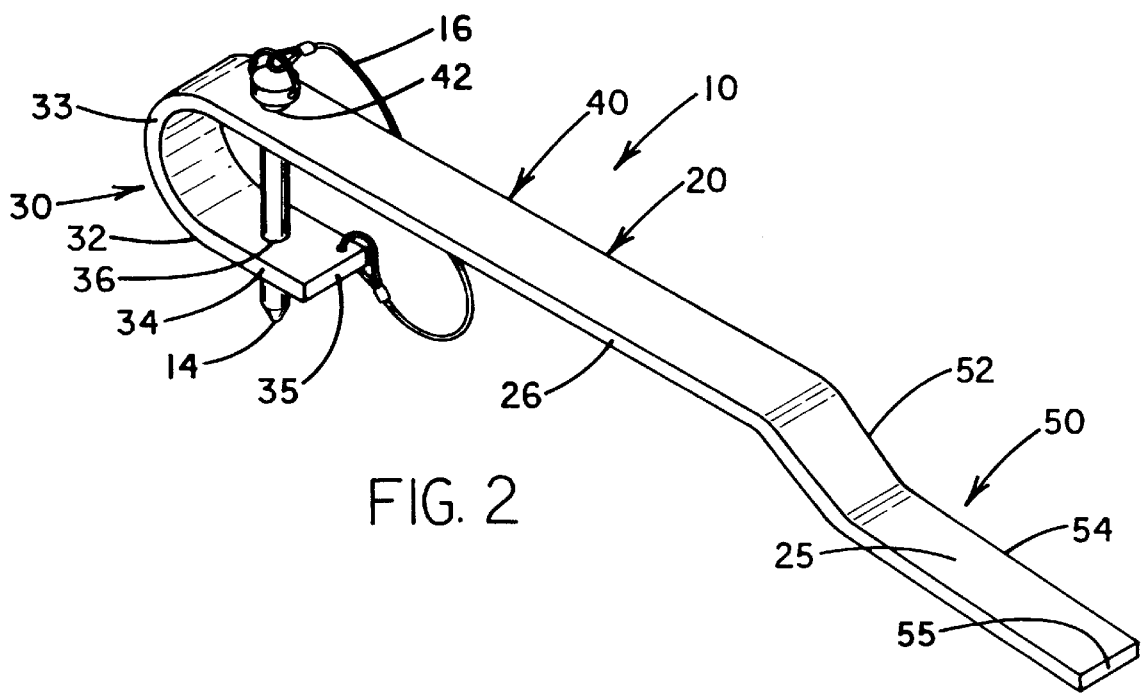
FIG. 2 is a schematic perspective view of the present invention.
Figure 3:
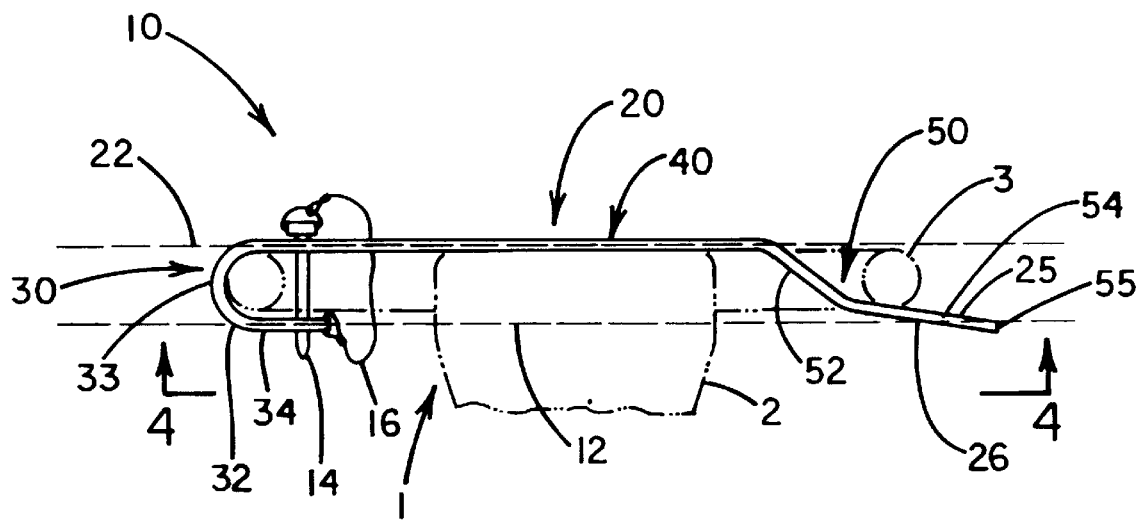
FIG. 3 is a schematic side view of the present invention is use.
Figure 4:
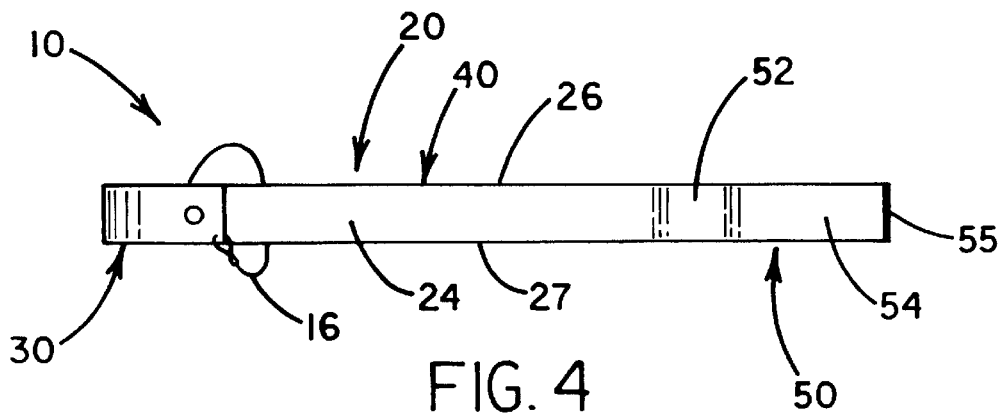
FIG. 4 is a schematic bottom side view of the present invention taken from line 4—4 of FIG. 3.

With reference now to the drawings, and in particular to FIGS. 1 through 4 thereof, a new air bag restrictor embodying the principles and concepts of the present invention and generally designated by the reference numeral 10 will be described.

The air bag restrictor 10 is designed for restricting the deployment of an air bag device housed within the central hub 2 of a steering wheel 1 having a peripheral rim 3. As best illustrated in FIGS. 1 through 4, the air bag restrictor 10 generally comprises an elongate bar 20 having a longitudinal axis 22, a first end portion 30, a central portion 40, and a second end portion 50. The central portion 40 is designed for positioning over the central hub 2 of a steering wheel 1 housing an air bag device. The second end portion 50 is designed for abutting against the backside of a portion of the peripheral rim 3 of a steering wheel 1. The first end portion 30 forms a hook 32 having an arcuate region 33 and an arm region 34. The arm region 34 of the hook 32 is spaced apart from the central region 40 to define a hooking space for receiving another portion of the perimeter rim 3 of a steering wheel 1 therein. The arm region 34 also has a first bore 36 extending therethrough while the central portion 40 has a second bore 42 extending therethrough coaxial with the first bore 36. One end of a securing pin is insertable through the first and second bores 36,42 to secure a portion of the peripheral rim 3 of a steering wheel 1 within the hook space.

In closer detail, the elongate bar has a longitudinal axis 22, a first end portion 30, a central portion 40, and a second end portion 50. The central portion 40 of the bar 20 is designed for positioning over the central hub 2 of a steering wheel 1 housing an air bag device with the first surface 24 of the central housing 40 facing the central hub 2 of the steering wheel 1. For reference, a second axis 12 is spaced apart from the first surface 24 of the bar 20 and is substantially parallel to the longitudinal axis 22 of the bar 20.

The first end portion 30 of the bar forms a hook 32 having an arcuate region 33 and an arm region 34 which terminates at a first terminus 35 extending towards the second end portion 50 of the bar 20. Preferably, the arm region 34 is extended along the second axis 12. The arm region 34 is spaced apart from the central region 40 of the bar 20 to define a hooking space for receiving a portion of the perimeter rim 3 of a steering wheel 1 therein.

The arm region 34 also has a first bore 36 extending through it. Similarly, the central portion 40 has a second bore 42 extending through it between the surfaces 24,25 of the bar 20 and coaxial with the first bore 36. One end of a securing pin 14 is insertable through the first and second bores 36,42 to secure a portion of the peripheral rim 3 of a steering wheel 1 within the hook space. Preferably, the other end of the securing pin is coupled to the first terminus 35 by an elongate flexible member 16.

Preferably, the second end portion 50 of the bar 20 has a bent region 52 and an abutment region 54 which terminates at a second terminus 55. The bent region 52 is extended from the longitudinal axis 22 of the bar 20 towards the second axis 12. Ideally, the abutment region 54 is extended in a generally parallel direction to the second axis 12. The second surface 25 of the abutment region 54 of the second end portion 50 is designed for abutting against the backside of another portion of the peripheral rim 3 of a steering wheel 1 diametrically opposed to the portion held within the hook space of the hook 32 to help hold the bar 20 to the steering wheel 1.

In an illustrative embodiment of the invention 10, the bar 20 ideally has a over all length of about 18 inches with the arm region 34 of the hook 32 having a length of about 4 inches. In this illustrative embodiment, the bar 20 also has a thickness defined between the surfaces 24,25 of the bar 20 of about ¼ inch and a width defined between the edges 26,27 of the bar 20 of about 1 inch. This illustrative embodiment is ideal for quickly mounting the restrictor 10 over the steering wheel 1 of a vehicle to prevent an undeployed air bar housed within the central hub 2 of the steering wheel 1 from deploying.

In use, the restrictor 10 is quickly and easily mounted to a steering wheel by first positioning the second surface 25 of the abutment region 54 against the back side of the peripheral rim 3 of the steering wheel 1. The hook 32 may then hooked over to another portion of the peripheral rim 3 so that the central portion 40 extends over the central hub 2 of the steering wheel. The securing pin 14 is then inserted through the bores 36,42 to hold the peripheral rim 3 within the hook space of the hook.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air bag restrictor for restricting the deployment of an air bag device housed within the central hub of a steering wheel having a peripheral rim, said air bag restrictor comprising:

an elongate bar having a longitudinal axis, a first end portion, a central portion, a second end portion, first and second surfaces, and first and second edges, said central portion of said bar being for positioning over the central hub of a steering wheel housing an air bag device, said second surface of said second end portion being for abutting against the backside of a portion of the peripheral rim of a steering wheel;

said first end portion of said bar forming a hook having an arcuate region and an arm region, said arm region of said hook portion terminating at a first terminus, said arm region of said hook being spaced apart from said central region of said bar to define a hooking space for receiving another portion of the perimeter rim of a steering wheel therein;

said arm region of said hook having a first bore extending therethrough;

said central portion of said bar having a second bore extending therethrough, said second bore being coaxial with said first bore;

a securing pin having opposite ends, one of said ends of said securing pin being insertable through said first and second bores to secure a portion of the peripheral rim of a steering wheel within said hook space.

2. The air bag restrictor of claim 1, wherein a second axis is spaced apart from said first surface of said bar, said second axis being substantially parallel to said d longitudinal axis of said bar, and wherein said arm region of said hook is extended along said second axis.

3. The air bag restrictor of claim 1, further comprising an elongate flexible member coupling another of said ends of said securing pin to said first terminus.

4. The air bag restrictor of claim 1, wherein said second end portion of said bar has a bent region and an abutment region, said abutment region of said second end portion terminating at a second terminus, said bent region being extended from said longitudinal axis of said bar towards said second axis, said second surface of said abutment region of said second end portion being for abutting against the backside of the peripheral rim of a steering wheel.

5. The air bag restrictor of claim 4, wherein said abutment region is extended in a generally parallel direction to said second axis.

6. An air bag restrictor for restricting the deployment of an air bag device housed within the central hub of a steering wheel having a peripheral rim, said air bag restrictor comprising:

an elongate bar having a longitudinal axis, a first end portion, a central portion, a second end portion, first and second surfaces, and first and second edges, said central portion of said bar being for positioning over the central hub of a steering wheel housing an air bag device;

a second axis being spaced apart from said first surface of said bar, said second axis being substantially parallel to said longitudinal axis of said bar;

said first end portion of said bar forming a hook having an arcuate region and an arm region, said arm region of said hook portion terminating at a first terminus, said arm region of said hook being spaced apart from said central region of said bar to define a hooking space for receiving a portion of the perimeter rim of a steering wheel therein;

wherein said arm region of said hook is extended along said second axis;

said arm region of said hook having a first bore extending therethrough;

said central portion of said bar having a second bore extending therethrough, said second bore being coaxial with said first bore;

a securing pin having opposite ends;

an elongate flexible member coupling one of said ends of said securing pin to said first terminus, another of said ends of said securing pin being insertable through said first and second bores to secure a portion of the peripheral rim of a steering wheel within said hook space; and said second end portion of said bar having a bent region and an abutment region, said abutment region of said second end portion terminating at a second terminus, said bent region being extended from said longitudinal axis of said bar towards said second axis, said abutment region being extended in a generally parallel direction to said second axis, said second surface of said abutment region of said second end portion being for abutting against the backside of another portion of the peripheral rim of a steering wheel.

* * * * *